(12) United States Patent
Wang

(10) Patent No.: US 6,305,270 B1
(45) Date of Patent: Oct. 23, 2001

(54) ELECTRIC FRYER WITH AN ELEVATING MECHANISM

(76) Inventor: Donglei Wang, No. 4 Workshop Building, Pinglanyuan, Industrial Zone, Nanping Town, Zhuhai, Guangdong Province (CN), 519060

( * ) Notice: Subject to any disclaimer, the term of this patent is extended or adjusted under 35 U.S.C. 154(b) by 0 days.

(21) Appl. No.: 09/579,129

(22) Filed: May 30, 2000

(30) Foreign Application Priority Data

Sep. 27, 1999 (CN) ................................................ 99238903

(51) Int. Cl.[7] .................................................. A47J 37/12
(52) U.S. Cl. ............................ 99/336; 99/348; 99/407; 99/409; 99/410
(58) Field of Search ........................... 99/407, 336, 409, 99/410, 408–417, 348

(56) References Cited

U.S. PATENT DOCUMENTS

| | | | |
|---|---|---|---|
| 5,500,237 | * | 3/1996 | Gell, Jr. et al. ................... 99/474 X |
| 5,771,781 | * | 6/1998 | Sham ...................................... 99/336 |
| 5,931,081 | * | 8/1999 | Sham et al. ........................... 99/336 |
| 6,006,658 | * | 12/1999 | Siu ......................................... 99/336 |

* cited by examiner

*Primary Examiner*—Reginald L. Alexander
(74) *Attorney, Agent, or Firm*—Arent Fox Kintner Plotkin & Kahn, PLLC

(57) ABSTRACT

An electric fryer with an elevating mechanism, includes a housing, a top cover, a fryer body, heating elements, a food basket assembly, a temperature controller, a cutout fuse and a timer. The electric fryer also includes an elevating mechanism. It is capable of lifting or lowering the food basket automatically, thus realizing the automation of the frying process.

2 Claims, 5 Drawing Sheets

ELECTRIC FRYER WITH AN ELEVATING MECHANISM

FIELD OF THE INVENTION

The present invention relates to a food processing device, and especially to an electric fryer with an elevating mechanism.

BACKGROUND OF THE INVENTION

The existing fryer, especially the electric fryer, is usually composed of a concave pot, and its food basket is normally lifted up manually after the food therein has been cooked. Moreover, the basket cannot be removed until the oil has been drained. Therefore, the cooking efficiency is rather low.

SUMMARY OF THE INVENTION

The object of the present invention is to provide an electric fryer with an elevating mechanism, which is capable of lifting or lowering the food basket automatically, thus realizing the automation of the frying process.

The electric fryer with an elevating mechanism according to the present invention comprises a housing, a top cover, a fryer body, heating elements, a food basket assembly, a temperature controller, a cutout fuse and a timer, and it is characterized in that said electric fryer also includes an elevating mechanism.

Said elevating mechanism is composed of a hoisting sheave, a cam, limit switches and an electromotor, wherein the cam and the hoisting sheave are sequentially secured on the spindle of the electromotor, which is fixed in the housing, and a limit switch is symmetrically arranged at either side of the spindle. Said food basket assembly consists of a food basket, a first rocker, a second rocker, a supporting rod, a slide hook, a sliding sleeve, an axle and a handle, wherein one end of the first rocker is connected with the food basket and the other end is connected with the supporting rod and the slide hook, whereas one end of the second rocker is connected with the food basket and the other end is connected with the supporting rod. Said food basket is suspended in the fryer body by means of the first and the second rockers, the supporting rod is stationarily connected with the sliding sleeve by a screw, and the handle is connected with the slide hook by the axle.

Since the electric fryer of the present invention comprises the elevating mechanism and the food basket assembly, the food basket may be lifted up and down automatically, so that the frying process is simplified. Therefore, the operation is simple, efficient and convenient, and the oil can be drained automatically, thus reducing the consumption of oil.

DETAILED DESCRIPTION OF THE INVENTION

The above and other features and advantages of the invention are hereinbelow illustrated in detail in combination with the accompanying drawings.

Figure 1:
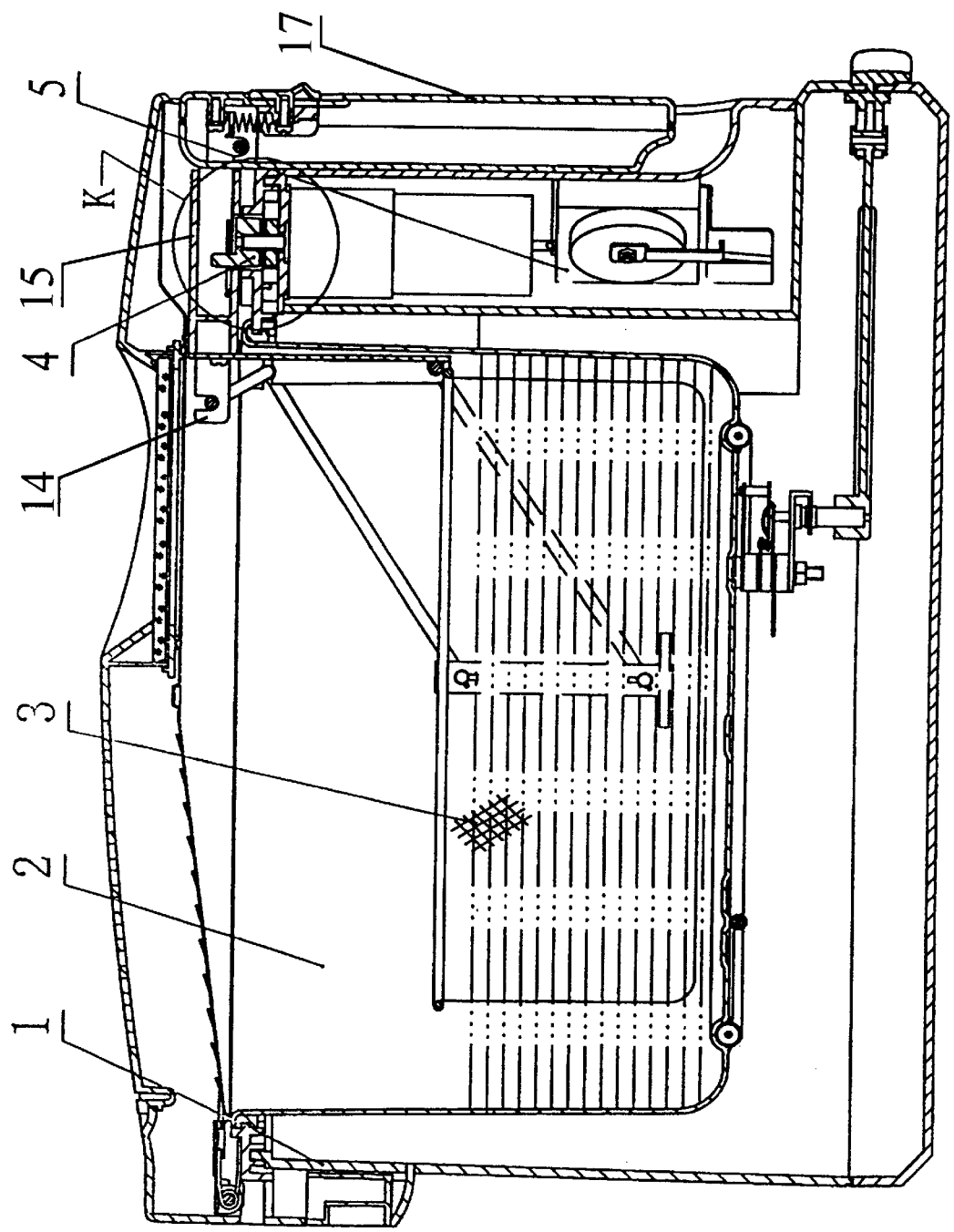
FIG. 1 is a structural diagram showing the food basket which is lowered to the frying position.
Figure 2:
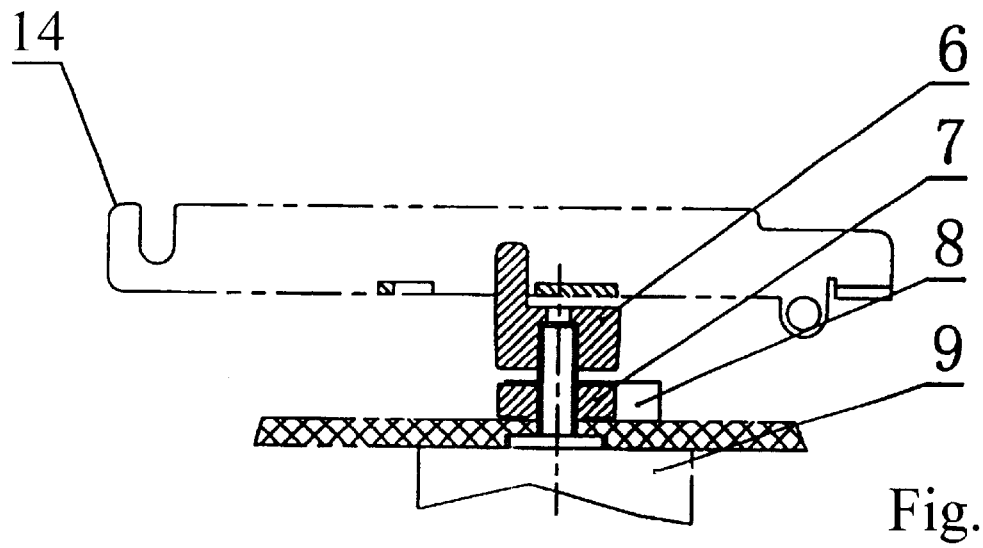
FIG. 2 is an enlarged view of the elevating mechanism marked as K in FIG. 1.
Figure 3:
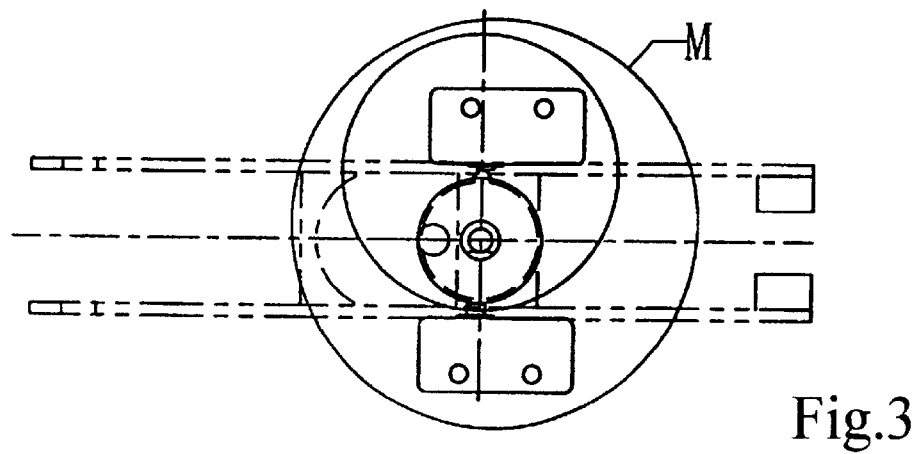
FIG. 3 is the top view of FIG. 2.
Figure 4:
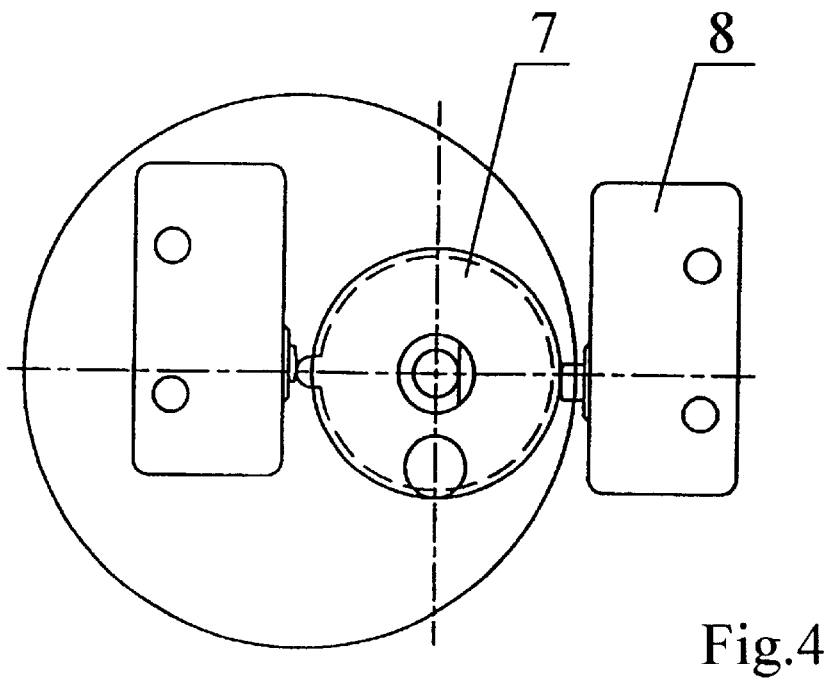
FIG. 4 is an enlarged view marked as M in FIG. 3.

Referred to FIG. 1, the electric fryer according to the invention, comprising a housing 1, a top cover, a fryer body 2, heating elements, a food basket assembly 3, a temperature controller, a cutout fuse and a timer 5, is characterized in that said electric fryer also includes an elevating mechanism 4. As shown in FIGS. 2–4 and 6–8, said elevating mechanism 4 is composed of a hoisting sheave 6, a cam 7, limit switches 8 and an electromotor 9, wherein the cam 7 and the hoisting sheave 6 are sequentially secured on the spindle of the electromotor 9, which is fixed in the housing 1, and a limit switch 8 is symmetrically arranged at either side of the spindle. It can be seen from FIG. 9 that said food basket assembly 3 consists of a food basket 10, a first rocker 11, a second rocker 12, a supporting rod 13, a slide hook 14, a sliding sleeve 15, an axle 16 and a handle 17, wherein one end of the first rocker 11 is connected with the food basket 10, and the other end is connected with the supporting rod 13 and the slide hook 14, whereas one end of the second rocker 12 is connected with the food basket 10, and the other end is connected with the supporting rod 13. Said food basket 10 is suspended in the fryer body 2 by means of the first and the second rockers 11, 12, the supporting rod 13 is stationarily connected with the sliding sleeve 15 by a screw, and the handle 17 is connected with the slide hook 14 by the axle 16.

The fryer body 2 and the timer 5 are arranged in the housing 1, whereas the temperature controller, the cutout fuse and the heating elements are positioned on the bottom of the fryer body 2.

The housing 1, the hoisting sheave 6 and the slide hook 14 make up a sine mechanism; the housing 1, the slide hook 14 and the first rocker 11 make up a slider-rocker mechanism; the housing 1, the food basket 10, the first rocker 11 and the second rocker 12 make up a double-rocker mechanism.

The operation of the electric fryer is now described in detail with reference to the accompanying drawings.

Figure 5:
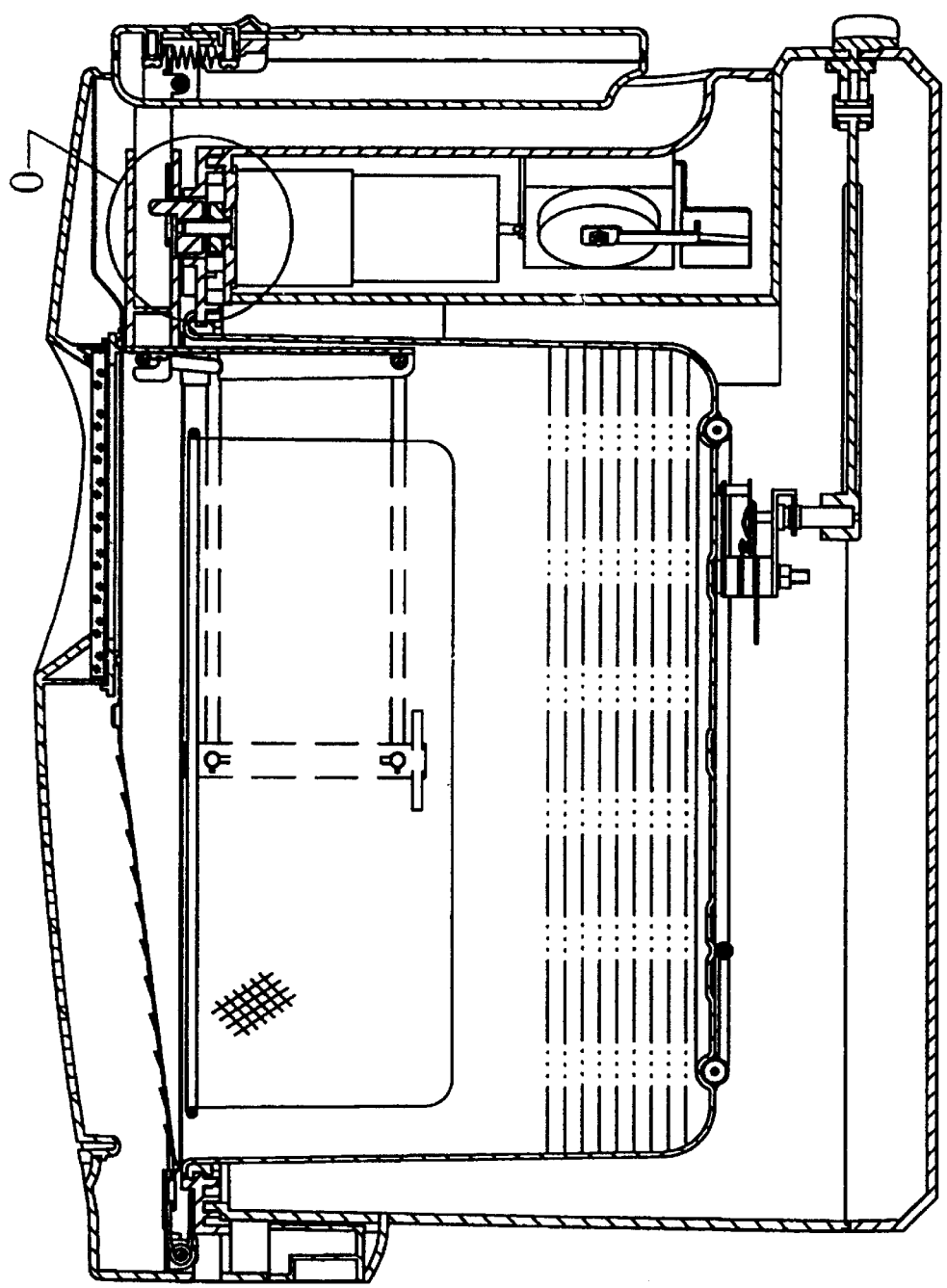
FIG. 5 is a structural diagram showing the food basket which is lifted to the non-frying position.
Figure 6:
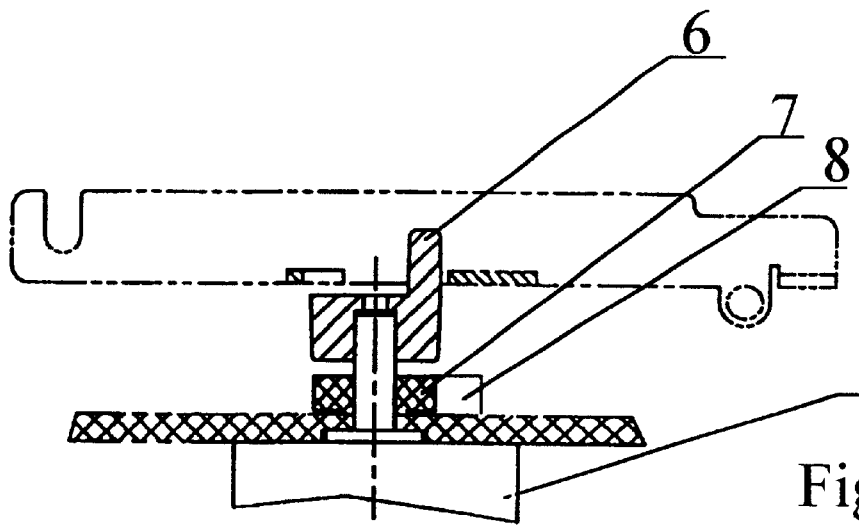
FIG. 6 is an enlarged view of the elevating mechanism marked as 0 in FIG. 5.
Figure 7:
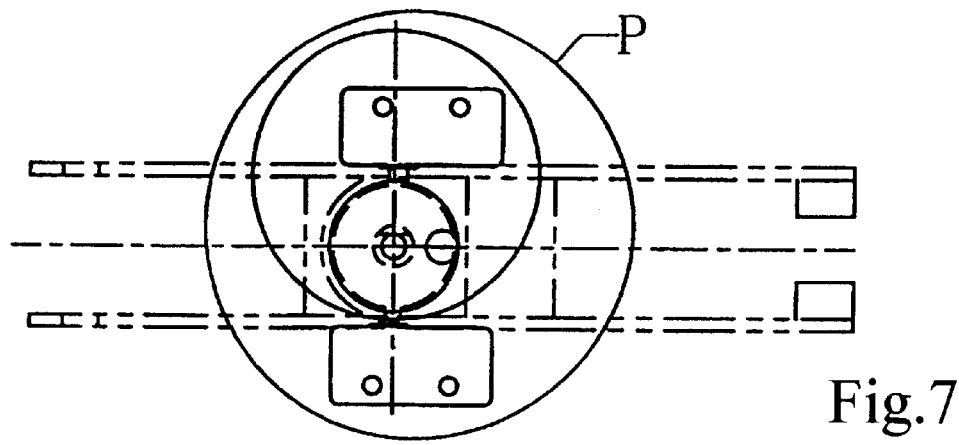
FIG. 7 is the top view of FIG. 6.
Figure 8:
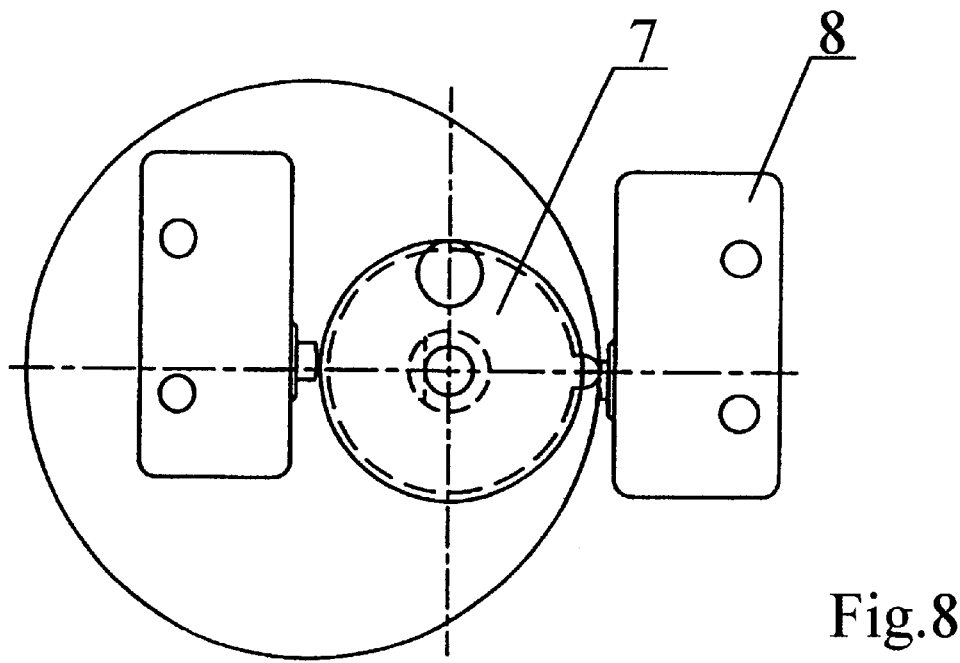
FIG. 8 is an enlarged view of P in FIG. 7.
Figure 9:
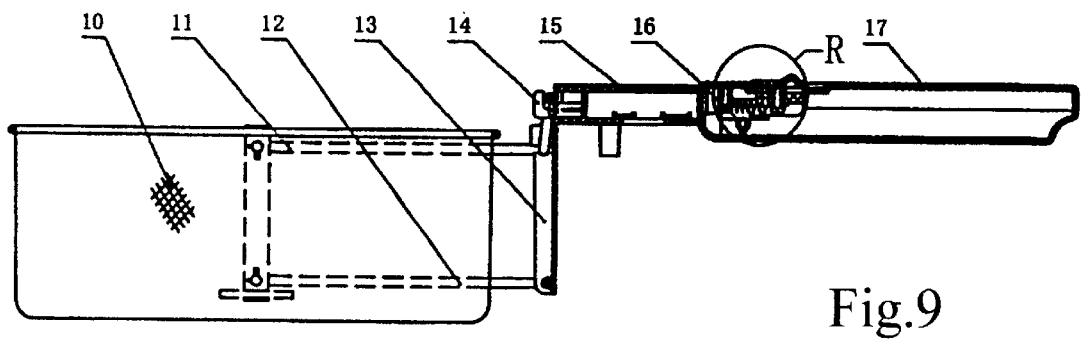
FIG. 9 is a structural diagram of the food basket assembly according to the invention.
Figure 10:
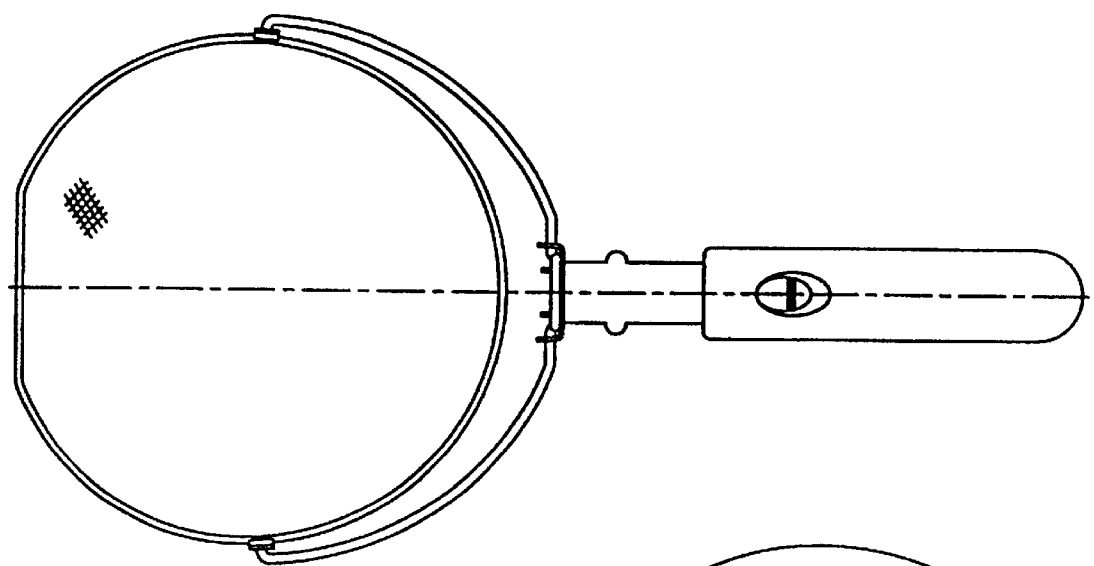
FIG. 10 is the top view of FIG. 9.
Figure 11:
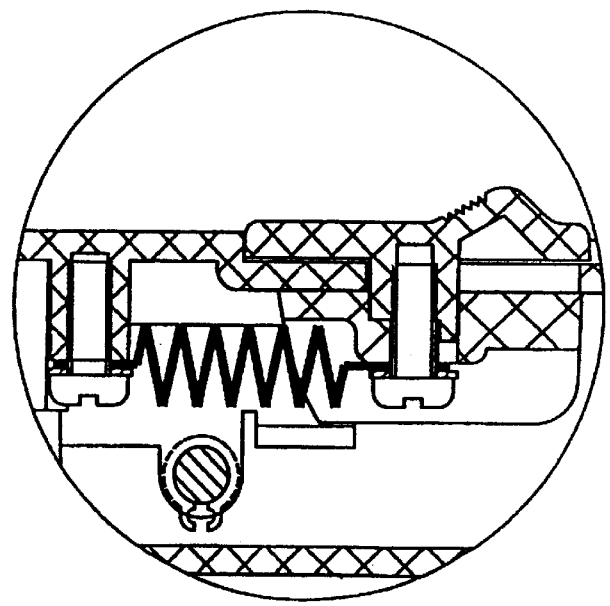
FIG. 11 is an enlarged view of R in FIG. 9.

First, preheat the fryer for three minutes, and then open the top cover and put the food basket assembly 3 with food into the housing 1. Subsequently, push the lock on the handle 17 to rotate the handle 17 clockwise from the horizontal position in FIG. 9 to the vertical position in FIG. 5. Next, close the top cover and rotate the timer knob. As a result, the hoisting sheave 6 and the cam 7 are driven by the electromotor 9 to rotate, and the food basket 10 is thus lowered from the position in FIG. 5 to the position in FIG. 1 due to its deadweight. The electromotor 9 stops rotating when the protrusion on the cam 7 comes into contact with one of the limit switches 8. Thereupon, the frying process starts. The timer 5 is switched off when the predetermined time is up, and so the hoisting sheave 6 and the cam 7 are driven by the electromotor 9 to rotate. In the meantime, the slide hook 14 is moved outwardly through the rotating of the hoisting sheave 6, and the first rocker 11 is driven to swing by means of the slider-rocker mechanism, and therefore the food basket 10 is raised by the double-rocker mechanism. When the protrusion on the cam 7 contacts one of the limit switches 8, the spindle of the electromotor 9 stops rotating. At this time, the food basket 10 is lifted up from the oil to the position as shown in FIG. 5. After the oil is drained, press the opening button to open the top cover. Rotate the handle 17 anticlockwise to the horizontal position as shown in FIG. 9, and then remove the food basket.

The users may set the temperature by sliding the temperature control button, and determine the frying time by turning the timer knob.

The present invention has the following advantages:

1. the entire frying process proceeds automatically without the user's intervention, thus making it easy and convenient. Moreover, it is really a revolutionary innovation in the field of the frying process, which results in the automation of cooking.
2. the food basket is immersed in the oil so that the food in the basket is fully exposed to the hot oil, thereby shortening the cooking time, raising efficiency, reducing the consumption of oil and frying the food evenly.
3. by means of the sine mechanism, the slider-rocker mechanism and the double-rocker mechanism, the food basket can move up and down in the fryer body regularly and steadily, so that the food therein will not tilt over.
4. the oil temperature can be controlled by the temperature controller and the frying time can be controlled by the timer, so that the user can select the recipes according to the types and quantities of the food. The problems of having the food either underdone or overdone in the conventional art of cooking can now be resolved. The users can formulate the best possible recipes according to the experiments on frying different types of food, thus making the food delicious.

What I claim is:

1. An electric fryer comprising:

housing having an open end with a top cover thereon, a fryer body suspended within the housing and containing oil therein, and a food basket assembly operatively disposed within the fryer body; an elevating mechanism is disposed within the housing at one side thereof and moves a food basket of the food basket assembly into and out from the oil contained within the fryer body, a timer is disposed within the housing and is operatively connected with the elevating mechanism, and heating elements are positioned at a bottom of the fryer body; wherein said elevating mechanism is composed of a hoisting sheave, a cam, limit switches and an electromotor, wherein the cam and the hoisting sheave are sequentially secured on a spindle of the electromotor, which is fixed in the housing, and a limit switch is symmetrically arranged at either side of the spindle.

2. The electric fryer according to claim 1, wherein said food basket assembly comprises a food basket, a first rocker, a second rocker, a supporting rod, a slide hook, a sliding sleeve, an axle and a handle, wherein one end of the first rocker is connected with the food basket and the other end is connected with the supporting rod and the slide hook, one end of the second rocker is connected with the food basket and the other end is connected with the supporting rod, said food basket is suspended in the fryer body by means of the first and the second rockers, the supporting rod is stationarily connected with the sliding sleeve by a screw, and the handle is connected with the slide hook by the axle.

* * * * *